No. 735,163. Patented August 4, 1903.

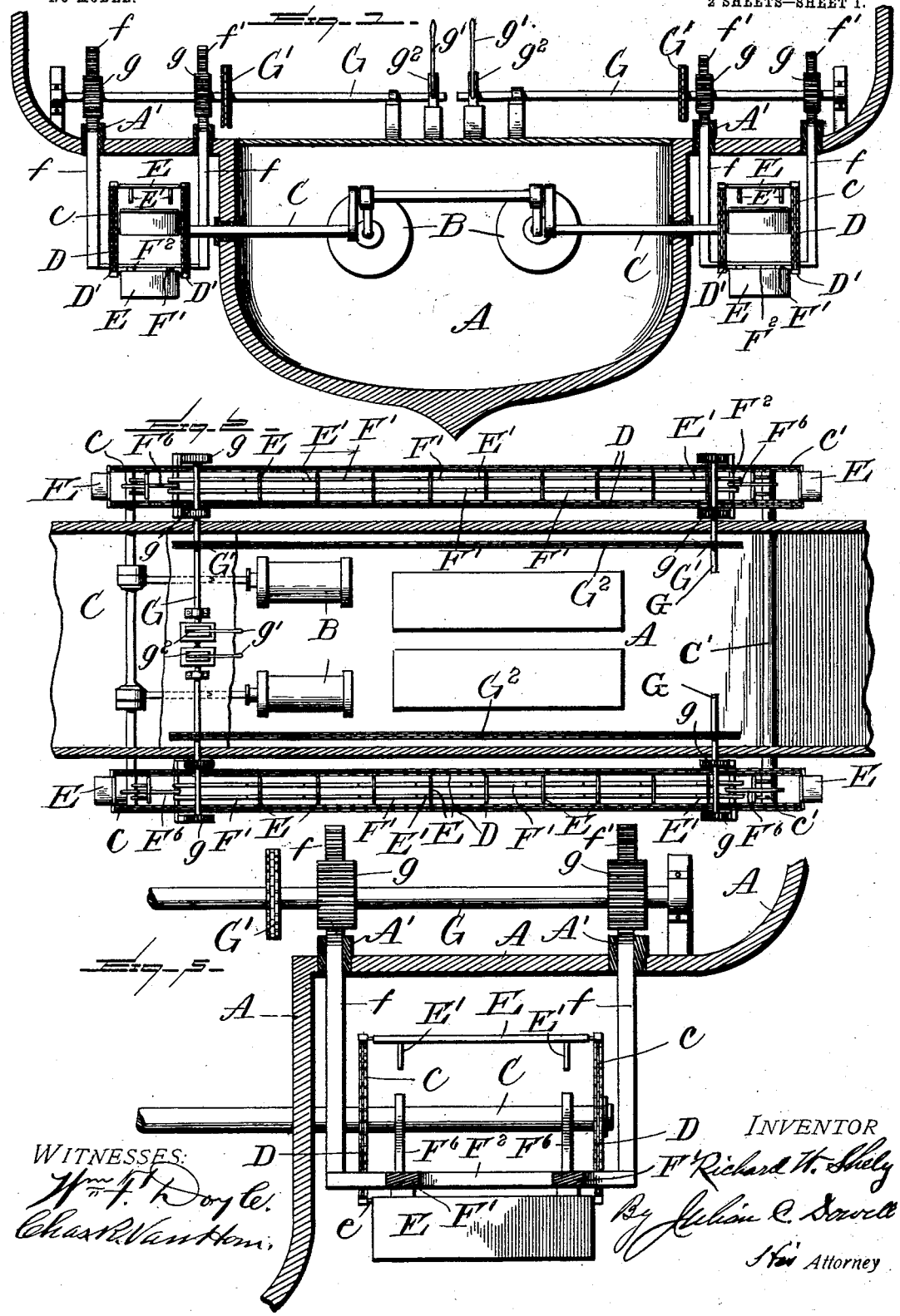

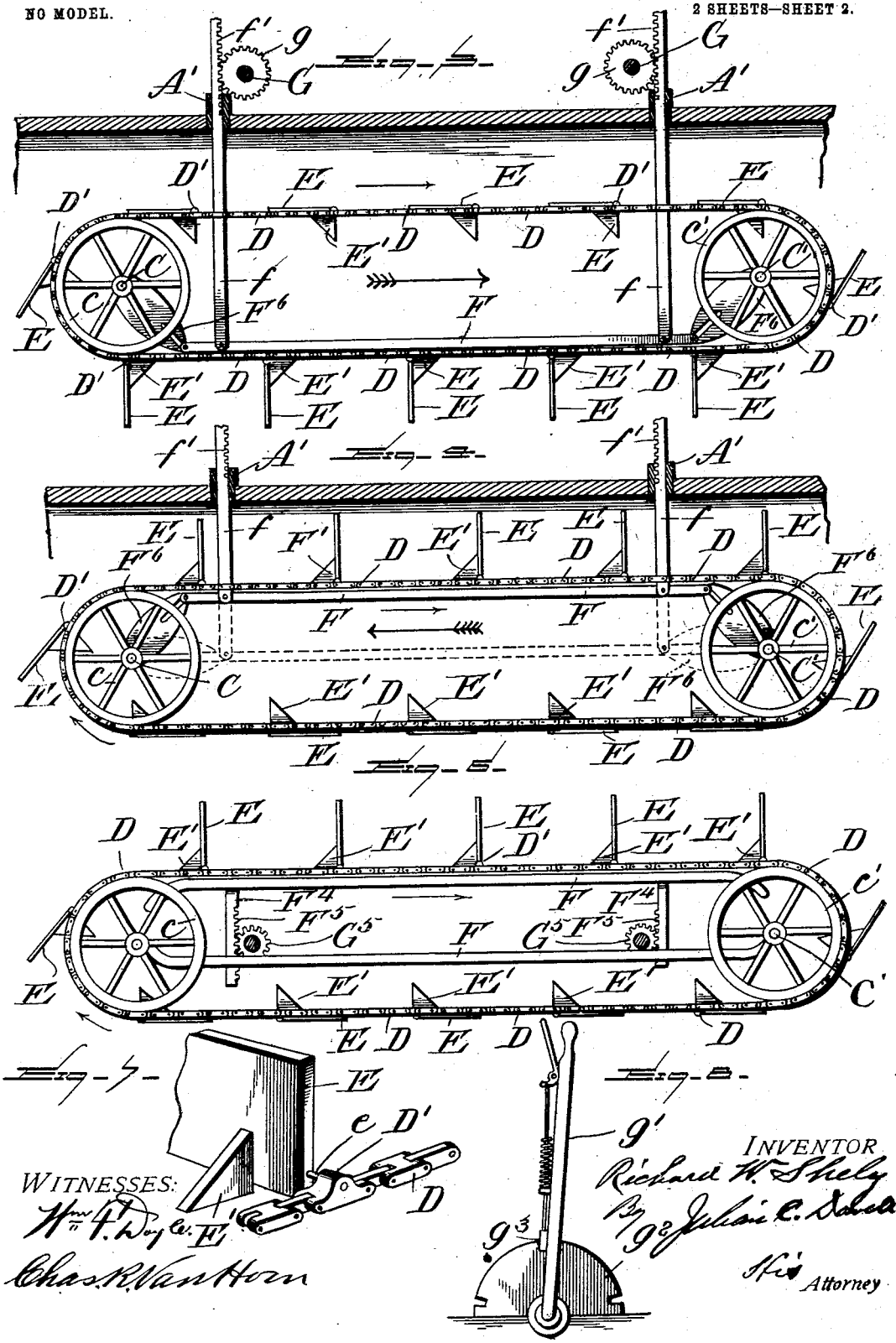

UNITED STATES PATENT OFFICE.

RICHARD W. SHELY, OF LEXINGTON, KENTUCKY.

PROPELLING APPARATUS.

SPECIFICATION forming part of Letters Patent No. 735,163, dated August 4, 1903.

Application filed September 14, 1901. Serial No. 75,386. (No model.)

*To all whom it may concern:*

Be it known that I, RICHARD W. SHELY, a citizen of the United States, residing at Lexington, in the county of Fayette and State of Kentucky, have invented certain new and useful Improvements in Propelling Apparatus; and I do hereby declare the following to be a full, clear, and exact description of the invention, such as will enable others skilled in the art to which it appertains to make and use the same.

This invention is an improved apparatus for propelling ships, boats, and other marine vessels; and the objects of the invention are, first, to enable the vessel to be driven either forward or backward at will without reversing the motion of the main driving-shafts of the apparatus or, in fact, the motion of the propelling-blades; second, to enable the vessel to move by momentum only or to lie idly in the water without stopping the main engines or the propelling mechanism, and, third, to enable the opposite propellers (when the vessel is equipped with two propellers at opposite sides) to be caused to work in opposition, so that the vessel can be turned very shortly or sharply without changing the direction of movement of the main driving-shafts or of the propellers themselves.

There are various other minor objects and capabilities of the invention, which will be hereinafter explained in the detailed description of the apparatus, which, in brief, comprises one or more sets of propeller-blades arranged in an endless series upon suitable carriers, by which they are continually moved in an endless path through the water, said carriers being driven by suitable connections with the engines within the vessel, which are arranged to drive the carriers continually in one direction and said blades being attached to the carriers in such manner that they may either lie in the same plane therewith, in which case they move edgewise through the water with practically no resistance, or they may be held perpendicular to the carriers, so that they act fully and effectively against the water, and mechanism is provided by which the blades can be caused to stand perpendicular to the carrier at either the top or bottom runs thereof or may be left idle or ineffective on both runs, thereby obtaining either a forward, reverse, or idle movement of the vessel without altering the direction or speed of movement of the main driving mechanism or engines.

The power of my propellers depends, primarily, upon the length of the endless carriers and, secondarily, upon the size of the blades thereof, and the speed obtained depends upon the velocity of movement of the carriers, and it is therefore an easy matter for the designer to construct a vessel which will have both great power and great speed. Furthermore, vessels may be equipped with one or more sets of the propelling apparatus. Where but one set is used, I preferably arrange it in the median line of the vessel and parallel with the longitudinal axis thereof. Where two or more sets are used, I preferably arrange them on opposite sides of the vessel, thereby enabling the vessel to be maneuvered or turned in very narrow waters.

In the accompanying drawings I have illustrated a vessel equipped with two sets of the apparatus, on opposite sides thereof, and also means for driving the same and for controlling the apparatus independently or together; but I do not consider my invention restricted to the particular arrangement or construction of parts herein shown and described except where the same is specifically referred to in the claims following the description, to which I refer for a more concise statement of the general nature and scope of the invention which I desire to protect herein, it being obvious that when the invention is once disclosed various modifications can or may be made therein within the scope of the invention to suit the particular vessel to which the apparatus is to be applied or as may best please the engineer in charge of the designing of the apparatus.

Referring now to the accompanying drawings, Figure 1 is a transverse vertical section through a vessel, showing two sets of propelling apparatus on opposite sides thereof. Fig. 2 is a sectional plan view of Fig. 1, showing the controlling mechanisms for the propelling apparatus. Figs. 3 and 4 are enlarged vertical side elevations of one of the sets of propelling apparatus, partly in section, detached. Fig. 5 is an enlarged transverse section through one of the propelling mechanisms. Fig. 6 is a side view of one of the propelling apparatus, indicating a slight modification thereof. Fig. 7 is a detail view of one of the blades and its connection to carrier, and Fig. 8 is a detail view of the hand operating devices for shafts G.

A designates a marine vessel of any kind to which the propeller is applied.

B designates the engines, which are merely indicated conventionally and which impart motion to the aft transverse driving-shaft C and, if desired, to the forward driving-shaft C' in any suitable manner not necessary to show or explain herein. The main shafts C C' extend through the sides of the vessel and overhang the hull thereof, as indicated in Fig. 1, and on their projecting ends are mounted wheels $c$ $c'$, preferably sprocket-wheels, upon which the endless carriers D D (preferably sprocket-chains) are supported and by which said carriers are driven in the direction indicated by the tailless arrows on the drawings. To each carrier (composed of two parallel opposite chains D) are pivotally secured a series of propeller-blades E, which are provided with pins $e$ at their inner corners journaled in suitable housings D', attached to the chains D, as indicated in Fig. 7, so as to permit the blades to swing on the carriers and either lie flat thereagainst or stand perpendicular thereto. Each blade has projecting from its rear face one or more cam-lugs or stops E', by which it will be upheld in vertical position against the pressure of the water when such lugs contact with and during their traverse along a cam-plate F, which is disposed between the runs of the carrier D and may be lowered into position to engage the lugs E' on the blades on the bottom run of carrier (shown in Fig. 3) or elevated into position to engage the lugs of the blades on the upper runs of the carrier, as shown in Fig. 4, or said cam-plate may be adjusted to a central position, as indicated in dotted lines, Fig. 4, so that neither upper nor lower blades will be in active operation. This cam-plate F may be guided in its vertical movements by the slotted plates $F^6$, which are loosely hung on shafts C and have slots in their free ends engaged by the cam-plate, as shown. Said cam-plate F may be and preferably is composed of two longitudinal bars F', connected by transverse bars $F^2$, braced, if desired, in any suitable manner, bars F' being spaced so as to properly engage the cam-lugs E' of the blades when the cam-plate is properly adjusted, and bars $F^2$ project slightly beyond the carriers and blades, as shown in Fig. 5, and are connected to vertical bars $f$ $f$, which extend up through suitable boxes or casings A' to and through the floor of the overhanging portions of the vessel, as indicated in Figs. 1 and 5, and are provided with racks $f'$ on their upper ends which are engaged with pinions $g$ on horizontal rock-shafts G, journaled in suitable bearings in the vessel. Preferably the rear rock-shafts G extend to the center of the vessel and nearly meet, while the forward rock-shafts G may be shorter. The rock-shafts G G on same side of vessel and for same propelling apparatus may be connected by suitable gearing so as to move synchronously, and I have indicated sprocket-gearing for this purpose in the drawings, consisting of sprockets G' on shafts G G and connecting sprocket-chain $G^2$; but do not restrict myself to such gearing.

By rocking one shaft G of course its companion shaft G will be similarly rocked, and thereby through pinions $g$ and racks $f'$ the cam-plate F will be adjusted up or down at will. These shafts G may be rocked together or separately, at the will of the engineer, by suitable mechanism, which it is unnecessary to describe here in detail; but I have indicated how the said shafts can be rocked by hand by attaching levers $g'$ to the inner ends of the rear shafts G G, and I have also shown segments $g^2$, fixed beside said levers and provided with opposite notches, with which a latch $g^3$ on lever $g'$ may be engaged, so as to lock the shaft in the position to which it is rocked, and consequently hold the cam-plate in either position to which it is adjusted. When the lever $g'$ is locked in the central or intermediate position, the cam-plate will be in such position that the blades E will move idly through the water, as indicated in dotted lines in Fig. 4.

Of course I do not restrict myself to hand-operated mechanism for controlling or adjusting the cam-plates F, as obviously there are many mechanical devices which can be utilized for this purpose within the knowledge of an expert constructor. The plates $F^6$ also serve as cams for turning the blades upon their pivots on the carriers at the ends of the carriers, the edges of plates $F^6$ being curved, as shown, so that when the cam-plate F is in the raised position (indicated in Fig. 4) the cam-lugs E' on the blades E will ride upon the edges of plates $F^6$ and be easily directed onto and from the cam-plate F and caused to assume the correct working position and allowed to drop from such position in an easy and gradual manner. When the cam-plate is lowered to position shown in Fig. 3, the same effect is produced, the cam-lugs E' of the blades then engaging the under sides or edges of plates $F^6$.

The foregoing-described construction of adjusting devices for cam-plate F requires the location of shafts G above the plane of shafts C C'. This may sometimes be undesirable, and in Fig. 6 I have shown a modification in which two cam-plates F are used, both placed between the upper and lower runs of the belt and rigidly connected together by vertical braces $F^4$, on which may be rack-bars $F^5$, that mesh with pinions $G^5$ on shafts G, so that by rocking said shaft the said double cam-plate will be raised or lowered. In this case the upper cam-plate acts only on the blades on the upper run of the carriers, and the lower cam-plate acts only on the blades on the lower run of the carriers; but the parts are so proportioned that when the double cam-plate is in a central position it will not affect any of the blades, so that the same results can be obtained with this double cam-plate as with the single one.

Operation: The main shafts C C' being driven continuously in one direction, the carriers D D are moved continuously in the direction indicated by the tailless arrows, Figs. 3 and 4, and of course the upper parts of the carriers move horizontally in a direction opposite to the lower parts thereof. Now if the cam-plate F be lowered, as indicated in Fig. 3, the cam-lugs E' on blades E will be tripped thereby and held down, so that the blades E are kept in a position perpendicular to the lower run of the carrier as they move from front to rear, while the upper blades E will be idle, and will therefore lie flat upon or parallel with the upper run of the carrier. The lower set of blades E therefore will be in active operation and will by reaction against the water propel the vessel in the direction indicated by the tailed arrow in Fig. 3. Now if the cam-plate be raised to the position indicated in full lines, Fig. 4, the upper set of blades E will be brought into operation, while the lower set of blades will be idle. Consequently the vessel will be propelled rearwardly in the direction indicated by the tailed arrow in Fig. 4. If the cam-plate F be adjusted to an intermediate position, both the blades will be idle at both the upper and lower runs of the carriers. Consequently the vessel will not be propelled in either direction. If the engineer raises the cam-plate F of the propellers at one side of the vessel and lowers the cam-plate of the other set of propellers at the opposite side of the vessel, the propellers will act oppositely, one set pushing, the other set backing. Consequently the vessel will be turned in a very short circle. If the vessel be moving forward and the cam-plates be raised, as in Fig. 4, the vessel can be speedily stopped or reversed. All these operations, it will be observed, can take place without stopping the engines or reversing the motion thereof or reversing the motions of the carriers D. Thus I have a very simple powerful propelling and controlling mechanism for vessels of all kinds.

Where but one set of propellers is employed, turning of the vessel must be effected by the rudder in the ordinary manner; but the vessel could be stopped, started, and reversed, as above described, at will simply by turning the rock-shafts G. Further, while the apparatus is described and intended, primarily, as a means of propulsion for vessels of all kinds it is capable of use as a motor by anchoring the apparatus and letting the blades and carriers drive the shafts C C' instead of being driven thereby, and such double use of the apparatus is included in the invention. When used as a motor, the ease of reversing the same without stopping or changing the direction of the current of water is obvious.

I have shown and described the apparatus as if arranged fixedly in a horizontal plane and entirely submerged. This is preferable; but it could be used only partly submerged, but with consequent inability to perform some of the hereinbefore-described functions. I desire, however, to cover the apparatus in any position or arrangement wherein it may be desired to employ it, and, as before stated, do not limit myself to the precise construction, arrangement, and location of parts herein shown and described.

Having thus fully described my invention, what I claim as new, and desire to secure by Letters Patent of the United States, is—

1. In a propelling apparatus, a series of blades, means for moving them successively in an endless orbital path, and means whereby the blades on either top or bottom run may be caused to assume active operative positions below the surface of the water for forward or backward propulsion, or permitted to move idly and ineffectively through the water, at predetermined parts of their path, substantially as described.

2. The combination of an endless carrier, means for traveling the same, a series of blades connected to said carrier, and means whereby said blades on either top or bottom run may be caused to assume either active working positions at predetermined parts of their path of travel for forward or backward propulsion, or permitted to assume idle inoperative positions, at the will of the operator, substantially as described.

3. In a propelling apparatus for vessels, &c., an endless carrier, a series of blades connected thereto and moving therewith, and means for throwing the blades into operative position on either run of the carrier.

4. In a propelling apparatus for vessels, a series of blades and means for moving the same continuously in an endless path, and an adjustable cam-plate adapted to be moved beside either run of the path and keep the blades in such run in operative position.

5. In combination, an endless carrier, a series of blades connected thereto, provided with cam-lugs, and a cam-plate beside the carrier adapted to be engaged by said lugs to hold the blades in operative position.

6. The combination, of an endless series of blades, a cam-plate adapted to hold the blades in operative position, and the rack-bars, shafts and pinions for adjusting said cam-plate, and means for driving the series of blades continually in one direction, substantially as described.

7. In a propelling apparatus for vessels, the combination of an endless carrier, a series of blades hinged thereto and moving therewith, and an adjustable cam-plate adapted to be moved beside either run of the carrier and keep the blades in the adjoining run of the carrier in operative position, and means for driving the carrier.

8. The combination of an endless carrier, a series of movable blades thereon, provided with cam-lugs, and a cam-plate beside the carrier adapted to be engaged by said lugs to hold the blades in operative position, with means for adjusting said plate so as to cause the blades on either the upper or lower run of the carrier to be operative.

9. The combination of an endless carrier, a series of blades hinged thereto, a cam-plate adapted to hold the blades on the adjoining run of the carrier in operative position, and the rack-bars, shafts and pinions for adjusting said cam-plate, and means for driving the carrier continually in one direction, substantially as described.

10. In a propelling apparatus, the combination of driven wheels, the endless carrier mounted thereon and propelled thereby, the blades hinged to said carrier and provided with cam-lugs on one face, a cam-plate located between the runs of the carrier, and means for adjusting said plate in proximity to either run of the carrier whereby the blades on such run are caused to operate, substantially as described.

11. In a propelling apparatus the combination of wheels, the endless chain supported thereon and the series of blades hinged to said chains, provided with cam-lugs on their rear faces, with a cam-plate located between the upper and lower series of blades on said chains, the racks, pinions and gears for adjusting said cam-plate up or down, and the rock-shafts carrying said pinions and means for operating said rock-shafts, substantially as described.

12. The combination of a vessel, a propelling apparatus on each side thereof, each apparatus comprising an endless carrier, means for traveling such carrier, a series of blades connected to such carrier, and means for throwing said blades into operative or inoperative position; with mechanism whereby one propeller can be caused to operate oppositely to the other without reversing or altering the motion of the main driving-shafts.

13. The combination of a vessel, two similar propelling apparatus one at each side thereof, each comprising an endless carrier, a series of blades connected thereto and moving therewith, and means for simultaneously driving said carriers continuously in the same direction; with mechanism for causing the blades on either the upper or lower run of the carrier to come into active operation, and mechanism for adjusting said cam-plates similarly or oppositely, for the purpose and substantially as described.

14. In a propelling apparatus, the combination of driven wheels, the endless carrier mounted thereon and propelled thereby, the blades hinged to said carrier and provided with cam-lugs on one face, a cam-plate located between the runs of the carrier, and means for adjusting said plate in proximity to either run of the carrier, and the plates pivoted axially of the wheels and loosely connected to the ends of the cam-plate, for the purpose and substantially as described.

15. In a propelling apparatus, the combination of wheels, the endless chains supported thereon, and the series of blades hinged to said chains, provided with cam-lugs on their rear faces, with a cam-plate located between the upper and lower series of blades on said chains, the plates pivoted on the shafts of said wheels and slidably connected to the ends of the cam-plate, racks and pinions for adjusting said cam-plate up or down, the rock-shafts carrying said pinions and means for operating said rock-shafts, substantially as described.

16. The combination of a vessel, two similar propelling apparatus one at each side thereof, each comprising an endless carrier, a series of blades connected thereto and moving therewith, and means for simultaneously driving said carriers continuously in the same direction, with an adjustable cam-plate in each propelling apparatus adapted to cause the blades on either the upper or lower run of the related carrier to come into active operation, and mechanism for adjusting said cam-plates similarly or oppositely, for the purposes and substantially as described.

17. The combination of the endless carrier, the series of propeller-blades hinged thereto, and the adjustable cam-plate interposed between the runs of the carrier; with rack-bars for raising said cam-plate, the shafts and pinions for operating said rack-bars, and gearing between the front and rear rock-shafts, substantially as described.

18. The combination of a vessel, the front and rear shafts projecting from opposite sides thereof, the wheels on said shafts, and endless carriers mounted thereon; the series of propeller-blades attached to said carriers, vertically-adjustable cam-plates interposed between the runs of each carrier and adapted to cause the blades to assume operative positions; and mechanism whereby said cam-plates may be similarly or oppositely adjusted so as to control the movement of the vessel without stopping or reversing the motion of the main shafts or carriers, substantially as described.

19. The combination of the endless carrier, a series of propeller-blades hinged thereto, and an adjustable cam-plate interposed between the runs of the carrier; with rack-bars for raising said cam-plate, rock-shafts and pinions for operating said rack-bars, gearing between the front and rear rock-shafts, and the lever and segment for adjusting and locking said rock-shafts, substantially as described.

20. The combination of a vessel, the front and rear shafts projecting from opposite sides thereof, wheels on said shafts and endless carriers mounted thereon, a series of propeller-blades hinged to said carriers and provided with cam-lugs, vertically-adjustable cam-plates interposed between the runs of each carrier and adapted to engage the cam-lugs of the blades and cause the latter to assume operative positions; and rack-bars, pinions, rock-shafts, and connections, whereby said cam-plates may be similarly or oppositely adjusted, so as to control the movement of the vessel without stopping or reversing the motion of the main shafts or carriers, all substantially as described.

In testimony whereof I affix my signature in presence of two witnesses.

RICHARD W. SHELY.

Witnesses:
OSGOOD H. DOWELL,
CHAS. R. VAN HORN.